72766

F. Washbourne's Imp'd Bolts.

PATENTED
DEC 31 1867

Witnesses:
John W. Polle
Gustav Barg

Inventor:
F. Washburn
By VanSantvoord & Hauff
his Att'ys

United States Patent Office.

F. WASHBOURNE, OF NEW YORK, N. Y.

Letters Patent No. 72,766, dated December 31, 1867.

---

IMPROVEMENT IN BOLTS FOR SAW-FRAMES, &c.

---

The Schedule referred to in these Letters Patent and making part of the same.

---

TO ALL WHOM IT MAY CONCERN:

Be it known that I, F. WASHBOURNE, of 62 Reade street, New York, in the county of New York, and in the State of New York, have invented a new and useful Improvement in Bolts for Saw-Frames and other purposes; and I do hereby declare that the following is a full, clear, and exact description thereof, which will enable those skilled in the art to make and use the same, reference being had to the accompanying drawing, forming part of this specification, in which drawing—

Similar letters indicate corresponding parts.

This invention relates to the making of screw-bolts, such, for example, as are used for attaching the blade of a saw to its frame or handle. Such bolts have hitherto been made of one piece of metal, the ordinary mode of making them being to cast them, the head and shank being made in one piece. In the case of those which are used for uniting the blades of hand-saws to their frames or handles, the material employed is brass, which helps to give a handsome finish to the handle. Among other disadvantages or defects of screw-bolts when thus made is their brittle character, their coarse and rough appearance, the large percentage of material which is wasted in the manufacture, and their large cost.

In producing screw-bolts for saw-frames or handles, or other purposes, according to my invention, I make use of wrought metal only, (save for the nut,) and form the head and the shank entirely separate and apart from each other. In screw-bolts for saw-frames, I take sheet brass, and cut out the heads by means of punches or other suitable implements, and afterwards strike or swage them up to the form required by means of dies.

Figure 1:
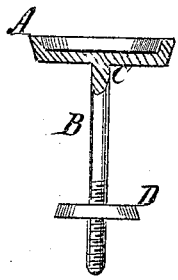
Figure 1 represents a screw-bolt or fastening made according to my invention, the head being in section.
Figure 2:
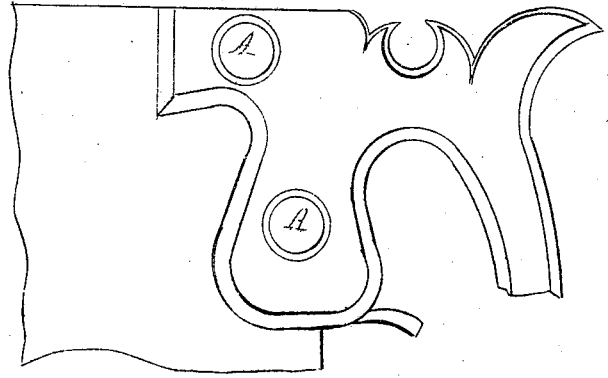
Figure 2 shows a portion of a saw-frame and a top view of its fastening-screw bolts.

In fig. 1, I have shown such a head, A, with a concavity formed on its upper surface by means of suitable dies. The upper surface of the head is, if desired, impressed, from the face of the die, with a trade-mark, or with the name of the maker, or with ornamental characters. The shank or body, B, is made of wrought wire, of the proper diameter, which is cut off to the proper length, and one end, after being made square, is united to the under surface of the head A by brazing or soldering at C, after which a screw-thread is formed on the other end of the shank.

When the screw-bolt is ready for use, the shank B is put through the frame or handle and saw-blade, and the end of the shank is secured by the nut D, in the usual manner.

Any kind of wrought metal can be employed, but in case of articles that require considerable finish, wrought brass is preferable, on account of its ornamental appearance.

Among other advantages obtained by my improvement is, that I am enabled to use wrought metal, producing thereby an article superior on account of its toughness and strength, and capable of more wear, than one made of cast metal, and less liable to break under great strain. Another is, that an ornamental character, or a name, or a trade-mark, can be impressed on the head in the operation of swaging or striking it up to the form required. Another advantage is, that the article can be made at a reduced cost compared with the cast bolt.

What I claim as new, and desire to secure by Letters Patent, is—

As a new article of manufacture, a headed bolt, made, as above described, of wrought metal, the head and shank being made in separate pieces, and afterwards brazed or soldered to each other, as specified.

F. WASHBOURNE.

Witnesses:
W. HAUFF,
GUSTAV BERG.